Dec. 13, 1960 H. J. McAULAY 2,964,104
RESERVE FUEL TANK
Filed March 19, 1956 3 Sheets-Sheet 1

INVENTOR
HUBERT J. McAULAY
BY Robert H. Mentag
ATTORNEY

INVENTOR.
HUBERT J. McAULAY
BY Robert G. Odentag
ATTORNEY

Dec. 13, 1960
H. J. McAULAY
2,964,104
RESERVE FUEL TANK
Filed March 19, 1956
3 Sheets-Sheet 3
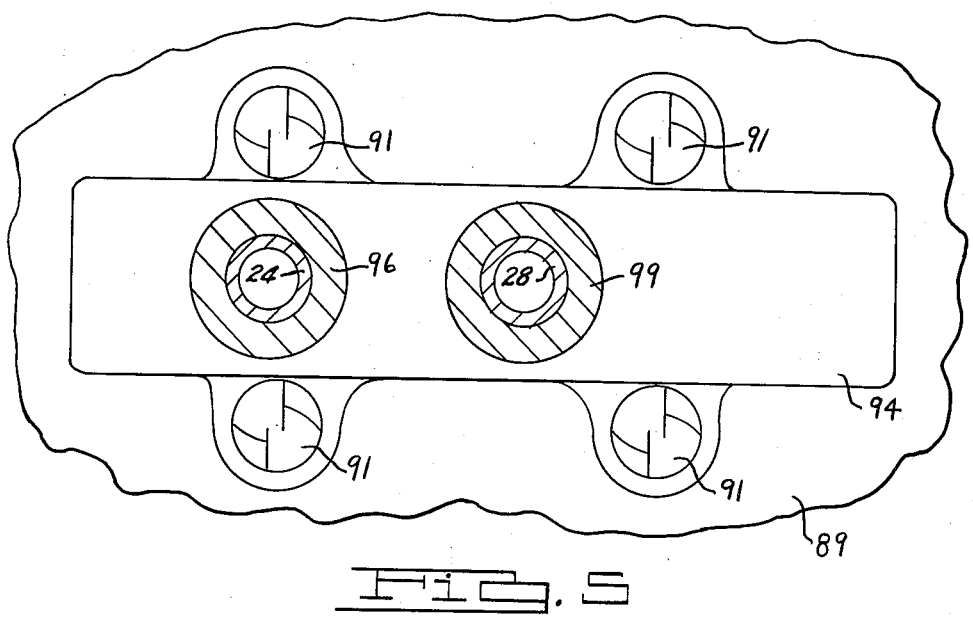
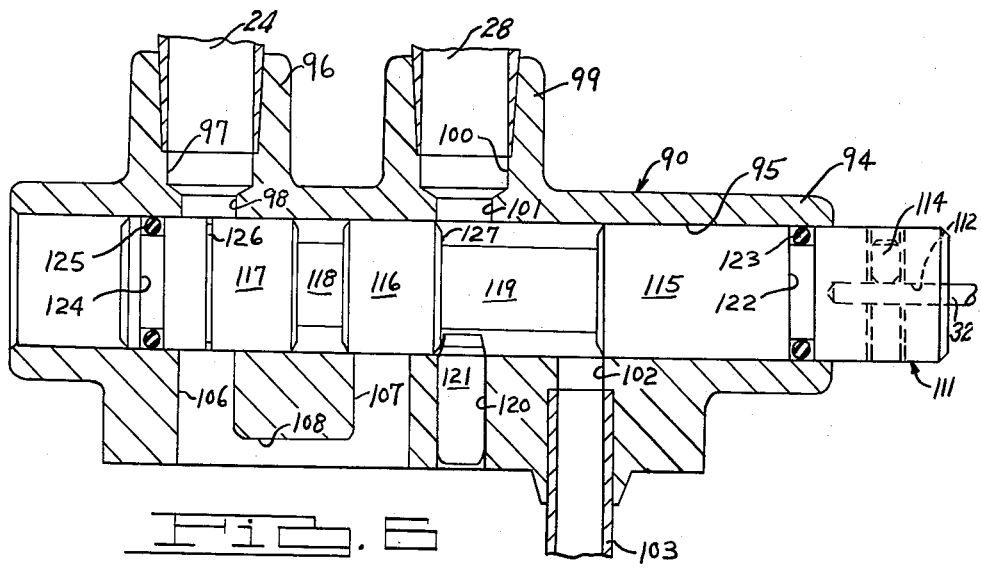
INVENTOR.
HUBERT J. McAULAY
BY Robert D. Mentag
ATTORNEY

United States Patent Office 2,964,104
Patented Dec. 13, 1960

2,964,104

RESERVE FUEL TANK

Hubert J. McAulay, 5160 S. Troost, Tulsa, Okla.

Filed Mar. 19, 1956, Ser. No. 572,523

3 Claims. (Cl. 158—46.5)

This invention relates generally to new and useful improvements in reserve fuel systems, and, more particularly, to a reserve gasoline tank especially adapted for use on automobiles, or like vehicles.

It is an important object of this invention to provide a new and improved reserve gasoline tank for an automobile, or the like, which is constructed and arranged to be connected in the fuel line leading from the main gasoline tank, at a point between the fuel pump and the carburetor, so that the reserve tank will be automatically refilled after it has been exhausted, by the fuel passing through said fuel line.

It is another object of this invention to provide a new and improved reserve gasoline tank of this class in which the gasoline is kept fresh by constant mixing with the gasoline circulating through the fuel line connecting the main gasoline tank to the carburetor.

It is a further object of this invention to provide a new and improved reserve gasoline tank of this class which is vented through the carburetor during the filling operation, whereby, the danger of leakage is minimized, and any fire hazards normally resulting therefrom are eliminated.

It is a still further object of this invention to provide a new and improved reserve gasoline tank of this class which may operate by pressure supplied by a fuel pump, whereby the reserve tank will work under many types of breakdown conditions, as when the main fuel tank is empty, when the fuel line from the main fuel tank to the fuel pump is broken, when the fuel pump is damaged, and when vapor lock occurs in the fuel line.

It is a further object of this invention to provide a new and improved reserve gasoline tank of this class which is simple and compact in structure, economical of manufacture, easy to install and highly efficient in use.

It is a still further object of this invention to provide a new and improved reserve gasoline tank of this class, which is adapted to provide an accurate determination of the gasoline mileage performance of a vehicle.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 5 is a partial horizontal view of the structure illustrated in Fig. 3, taken along the line 5—5 thereof; and Fig. 6 is a fragmentary view of the structure illustrated in Fig. 3, but showing the control valve spool moved to the discharge position.

Figure 1:
Fig. 1 is a schematic view of a vehicle fuel system provided with a reserve gasoline tank made in accordance with the principles of the invention.
Figure 2:
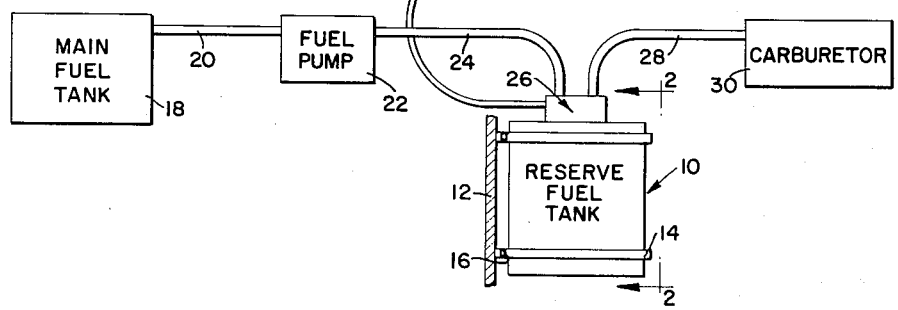
Fig. 2 is a broken side elevational view of the structure illustrated in Fig. 1, taken along the line 2—2 thereof.

Before explaining in detail the present invention, it is to be understood, that the invention is not limited in its application to the details of construction and arrangement of parts illustrated in the accompanying drawings, since the invention is capable of other embodiments and of being practiced or carried out in various ways. Also, it is to be understood, that the phraseology and terminology employed herein is for the purpose of description and not limitation.

In the drawings, the numeral 10 generally indicates a reserve gasoline tank made in accordance with the principles of the invention, and which is of a predetermined capacity, as for example, one gallon. The tank 10 is adapted to be mounted under the hood of a vehicle, on any suitable supporting member, as for example, the firewall 12 of the vehicle. Any suitable hangers or brackets may be employed for attaching the tank 10 to the firewall 12, as the brackets 14, which are secured to the firewall by the bolts 16.

The usual main gasoline tank of the vehicle is designated by the numeral 18 and is connected by the fuel line 20 to the usual fuel pump 22, which is in turn connected by the fuel line 24 to the reserve gasoline tank control valve which is generally designated by the numeral 26, and the operation of which is explained more fully hereinafter. A fuel line 28 operatively connects the control valve 26 with the usual vehicle carburetor 30. The control valve 26 is adapted to be manually operated by any suitable means, as by the flexible control wire 32, which may be arranged to pass through the dash panel 34 of the vehicle, and which is provided with a suitable knob or control button 36. If desired, the control wire 32 may be located in any accessible place adjacent the dash panel, instead of passing therethrough.

Figs. 2 through 6 illustrate the invention. The numeral 88 designates a reserve gas tank which is similar to the reserve gas tank 10 of Fig. 1. Fixedly mounted on the upper wall 89 of the reserve tank 88 is a control valve, generally designated by the numeral 90, and which is secured to the reserve tank 88 by means of a plurality of screws 91, which are adapted to pass through suitable apertures in the tank wall 89 and threadably engage a retainer member 92 on the inner side of said wall. A suitable gasket 93 is interposed between the tank wall 89 and the control valve 90. The control valve body 94 is provided with a longitudinally extending bore or aperture therethrough, as 95. A first boss 96 is integral with the valve body 94 and has formed therethrough a vertically disposed inlet port 97, which communicates with the passage 98 in the valve body 94. The passage 98 leads into the longitudinal aperture 95. A second boss 99 is integrally formed with the valve body 94 and has formed therethrough a vertically disposed outlet port 100 which communicates with the passage 101, which leads into the longitudinal aperture 95.

The valve body 94 is provided with a vertical aperture 102, on the lower side thereof, which communicates with the longitudinal aperture 95 and which extends downwardly to the bottom of the valve body. A downwardly extended tubing 103, is fixedly mounted in the aperture 102, as by a press fit, and it passes through an aperture 104 in the reserve tank upper wall 89, and extends to a point adjacent the bottom wall of the tank 88, as indicated by the numeral 105.

Figure 3:
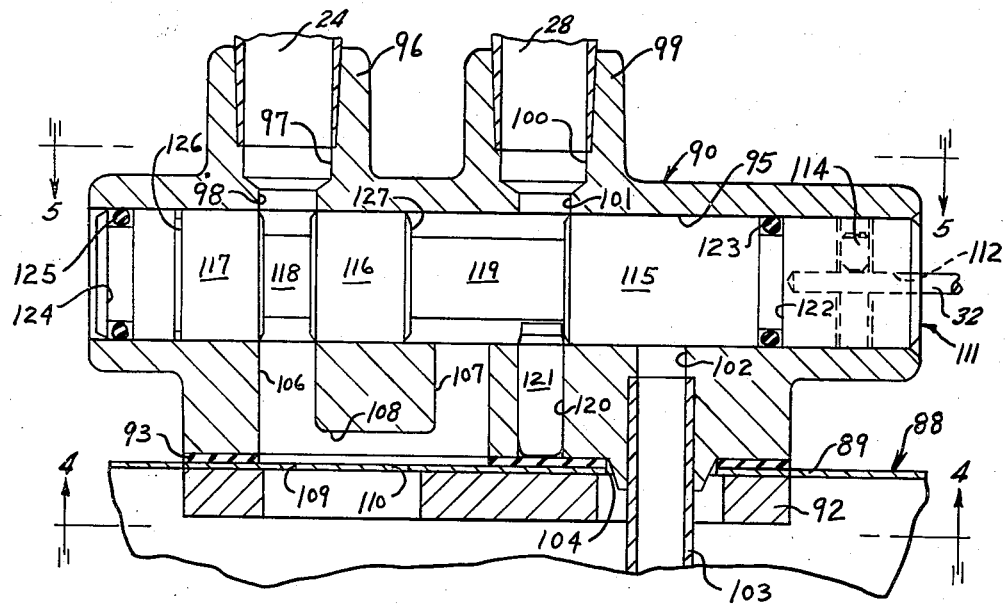
Fig. 3 is a broken, elevational view, in section, of the structure illustrated in Fig. 2, taken along the line 3—3 thereof.
Figure 4:
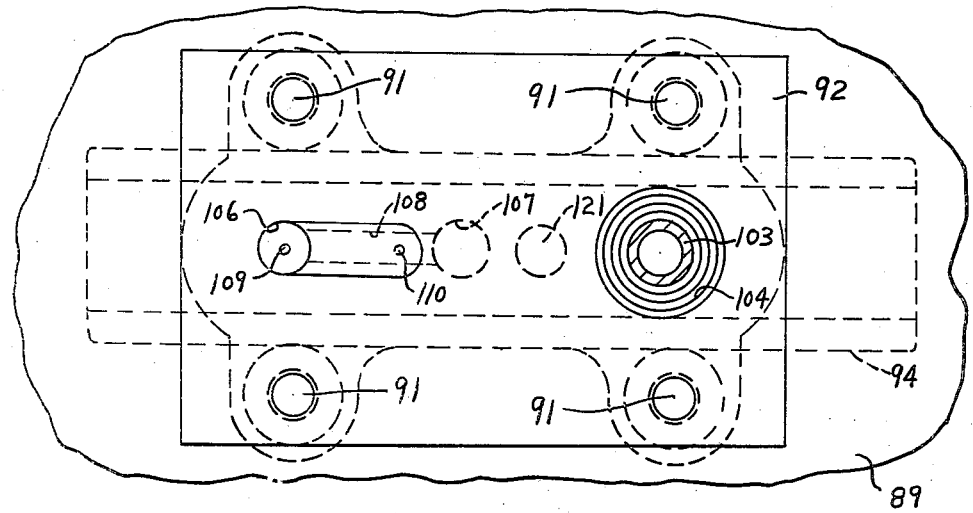
Fig. 4 is a partial horizontal view, partly in section, of the structure illustrated in Fig. 3, taken along the line 4—4 thereof.

The control valve 90 is provided towards the left end thereof, as viewed in Fig. 3, with a vertical aperture or passage 106, which communicates with the longitudinal aperture 95 and with the top wall of the tank 89. A second vertical aperture or passage 107, is provided in the control valve 90, and, it also communicates with the longitudinally extending aperture 95 and with the top wall 89 of the reserve tank 88. The passages 106 and 107 are connected by a horizontal passage 108 which is formed on the lower outer side of the control valve 90. The reserve tank upper wall 89 is provided with a pair of spaced apart apertures, therethrough, as 109 and 110, which open into the passage 108. The passages 106, 107 and 108 coact to provide a U-shaped fuel conduit means connected to the bore 95 and communicating with the tank 88.

Slidably mounted in the longitudinal aperture 95 in the valve body 94 is a valve spool 111. An axial, inwardly extending aperture 112 is formed in the right end of the valve spool 111, as designated by the numeral 112, and a flexible control wire 32 is fixedly secured in this aperture by means of a suitable set screw, as 114. The control valve spool 111 comprises the portions 115, 116 and 117, which are adapted to be slidably and complementarily engageable with the inner face of the longitudinal aperture 95, and which are connected by the reduced portions 118 and 119. The control valve 90 is provided with a vertically disposed aperture 120, in which is fixedly mounted a dowel pin 121, the upper end of which is adapted to extend upwardly into the longitudinal aperture 95, between the valve spool portions 115 and 116, to serve as a stop to position the valve spool 111. There will be no danger of any leakage past this dowel pin 121, since the bottom thereof rests on the gasket 93, and, accordingly, a close fit is not necessary for this dowel pin.

The control valve spool 111 is provided on the right end thereof, as viewed in Fig. 3, with an annular groove 122 in which is carried an O-ring 123 for sealing the right end of the control valve spool against leakage. The left end of the control valve spool 111 is provided with an annular groove 124 which carries an O-ring 125 for sealing the left end of the valve spool against leakage. As is shown in Fig. 3, the valve spool portion 117 is provided with a narrow transverse opening or annular groove 126 which is adapted to be aligned with the inlet port 97 when the valve spool 111 is moved to the right, as shown in Fig. 6.

Assuming that the reserve tank 88 has just been installed on the vehicle, and the main fuel tank 18 contains an adequate supply of fuel, the control valve spool 64 would be in the position shown in Fig. 3, to use fuel from the normal supply source. When the engine is started under these conditions, the fuel pumped from the fuel pump 22 will enter the inlet port 97, flow around the reduced valve spool portion 118, thence pass through the passage 106, through the smaller passage 108, up through the passage 107, around the valve spool reduced portion 119 and thence out to the carburetor 30 through the outlet port 100. Some of the fuel will leak through the small holes 109 and 110 into the reserve fuel tank 88. Since the usual vehicle fuel pump is designed to furnish fuel at a faster rate than is required by the vehicle engine, the float in the carburetor closes the needle valve partially and a pressure is built up in the system between the fuel pump 22 and the carburetor 30. Thus fuel will be forced into the tank 88, through the small holes 109 and 110, until the pressure in the tank reaches the maximum pressure capacity of the fuel pump 22. This type of filling action then ceases when the maximum pressure in the reserve tank is reached.

As the fuel flows from the passage 106 into the passage 108, the velocity of the flowing fuel is increased, and a pressure differential is created between the holes 109 and 110, in accordance with the well known flow equation commonly known as Bernoulli's Equation, with the pressure being greater at hole 109. With this condition existing, some of the fuel will flow from the passage 106 through the hole 109 and into the tank 88. At the same time bubbles of air will emerge from the tank 88, pass through the hole 110, and will be carried along with the fuel to the carburetor bowl, where they will be released to the atmosphere.

After the tank 88 is filled there will continue to be a steady mixing of the currently used fuel with the fuel already in the reserve tank, due to the flow of fuel out of the hole 110 and into the hole 109.

When the supply of fuel in the main tank 18 is depleted, the reserve tank 88 remains filled, because the drop tube 103 is blocked by the valve spool portion 115. In order to use the fuel from the reserve tank 88, the operator merely has to exert a pull on the wire 32, to shift the valve spool 111 to the position shown in Fig. 6. In this position, the valve spool portion 117 blocks off the inlet port 97, shutting off the fuel pump from the tank 88. At the same time passage 106 is blocked, and, the valve spool portion 116 also blocks off the passage 107 from communication with the outlet port 100. As shown in Fig. 6, the narrow annular groove 126 reaches the approximate mid-position of the inlet port 97, and, the right face 127 on the valve spool portion 116 makes contact with the dowel pin 121. The fuel pump 22 will pump air into the inlet port 97, through the small groove 126, into the passage 106, and through the holes 109 and 110 to produce a pressure on the surface of the fuel in the tank 88. Since the reduced portion 119 of the valve spool 111 is now in a position to connect the passage 102 to the outlet port 100, fuel will be forced up through the drop tube 103 and out of the control valve 90 to the carburetor 30.

Since the specific weight of air is about seven hundred times the specific weight of gasoline, the pressure required to pump air through the small annular groove 126 is much less than the pressure required to pump an equal volume of gasoline. Accordingly, if after using the reserve fuel from the tank 88 and refilling the main tank 18, the driver forgets to shift the valve spool 111 back to the position shown in Fig. 3, to use the fuel from the normal supply source or main tank 18, the car will operate satisfactorily at slow speeds where the fuel consumption rate is low. But, at high speeds, when the rate of fuel consumption is the highest, the vehicle engine will be starved for gasoline and the driver will be reminded to return the valve spool 111 to its normal operating position.

The embodiment of Figs. 2 through 6 has a number of definite advantages. The hoses connecting the control to the fuel pump and carburetor will be, in most cases, short and very accessible. The bracket for mounting the reserve tank 88 may be very simple, since the bottom of the tank will be flat and clean of obstructions or projections. The reserve tank 88 can be placed below the carburetor since the reserve fuel is supplied under pressure.

The reserve fuel tank illustrated herein may be used to permit an accurate determination of gasoline mileage for a vehicle, by means of the following procedure: (1) drive the vehicle until it runs out of gas; (2) record the odometer reading; (3) use the gas from the reserve tank to drive to a service station; (4) buy any desired amount of gasoline, say 5 gallons; (5) shift the reserve tank control valve to the normal operating position; (6) drive the vehicle until it runs out of gas again; and, (7) record the odometer reading. The difference between the first and second odometer readings will be the total number of miles obtained from the amount of fuel purchased for the test. The total number of miles run during the test, divided by the number of gallons of gasoline bought for the test will give the miles per gallon obtained during the test.

It will be understood that, although the reserve fuel device of the present invention is primarily designed for use on automobiles, trucks, busses and tractors, it may also be used for other purposes wherein a liquid fuel is to be intermittently supplied to a combustion means. An example of one of such other uses would be an application of the instant device to an oil fired furnace in a home or other building. A reserve fuel tank made in accordance with the present invention could be incorporated in the fuel supply line of an oil fired furnace between the pump on the furnace and the combustion chamber, in a manner similar to that shown in Fig. 1 as for a vehicle. When used in connection with an oil furnace, the reserve fuel device would preferably have a capacity of from 5 to 10 gallons, and, would function in the same manner as described herein before when applied to a vehicle. The reserve fuel device would protect the owner of a home when he misjudged the weather and failed to order fuel oil before his supply tank was empty.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a fuel flow system including a fuel pump and a carburetor, for a vehicle engine, the combination of: a reserve fuel tank adapted to be mounted on the vehicle; a fuel flow control valve fixedly mounted on the upper side of said tank; said valve having an inlet port adapted to be connected to the fuel pump in the fuel system, and an outlet port adapted to be connected to the carburetor on the engine; a first passage in the control valve which is adapted to communicate with said inlet port; a second passage in the control valve which is adapted to communicate with said outlet port; a third passage in said control valve interconnecting said first and second passages; said third passage being smaller in cross section than said first and second passages; a plurality of apertures in said tank which open into said third passage for automatically filling said tank with fuel from said third passage and for conveying air and fuel vapors out of said reserve tank; a fuel discharge port in the top of said reserve tank which is connected to a fourth passage in the control valve which communicates with said outlet port; a tube mounted in said discharge port and extending down into said tank; a valve spool slidably mounted in said control valve; said valve spool being provided with a transverse opening and being adapted to be moved to a first position, to block the fuel discharge port in the top of the tank, and, to connect said first and second passages with said outlet and inlet ports to permit the fuel to flow therethrough; whereby, some of the fuel will pass through said apertures into the tank and the air in the tank will pass through said apertures and be conveyed out of the tank; said valve spool being adapted to be moved to a second position, to block said first and second passages and to connect the tank discharge port to the valve outlet port and align the transverse opening in the valve spool with said first passage and with the inlet port; whereby, pressure may be forced by the fuel pump through the valve inlet and through said first passage and into the third passage and through the apertures into the tank, and, the fuel in the tank may flow to the carburetor of the vehicle; and, means for manually moving said valve spool.

2. A vehicle reserve fuel device of the class described, comprising: a closed fuel tank; a flow control valve fixed on said tank; said valve being provided with a fuel inlet port adapted for connection to the fuel pump in the vehicle fuel system, and an outlet port adapted for connection to the carburetor in the vehicle fuel system; fuel passage means through said valve and connectible with said inlet and outlet ports and communicating with said tank; a discharge port in said tank; an exit passage in said valve for connecting said discharge port to said valve outlet port; a valve spool means slidably mounted in said control valve and being movable to a first position for blocking said discharge port and connecting said fuel passage means to said inlet and outlet ports, and, to a second position for connecting said discharge port to said outlet port and blocking said fuel passage means; means for manually moving said valve spool means; means on said valve spool means for admitting pressure into said tank when the valve spool means is moved to said second position for forcing the fuel from said reserve tank and out the outlet port to the vehicle carburetor; said means on said valve spool means for admitting pressure to the tank including an annular groove on said valve spool means adapted to be aligned with the inlet port and the fuel passage means to permit pressure created by the fuel pump to pass into the tank when the valve spool means is moved to said second position; said control valve being mounted on the top of the tank; said fuel passage means including a first passage connectible to said inlet port and a second passage connectible to said outlet port; a third passage interconnecting said first and second passages and being open to the top of the tank; said third passage being smaller in cross section than said first and second passages; and, a plurality of apertures in said tank opening into said third passage.

3. A reserve fuel device of the class described, comprising: a closed fuel tank; a flow control valve fixed on said tank; a longitudinal bore formed in said control valve; a fuel inlet port formed in said control valve which communicates at one end thereof with said bore and which is adapted to be connected at the other end thereof to a fuel pump in a fuel system; a fuel outlet port formed in said control valve which communicates at one end thereof with said bore and which is adapted to be connected at the other end thereof to a fuel combustion means in the fuel system; a U-shaped fuel conduit means connected to said bore and communicating with said tank; a discharge port in said tank communicating with said bore; a valve spool means slidably mounted in said bore and being movable to a first position for blocking said discharge port and for connecting one end of said U-shaped conduit means to said inlet port and the other end of said U-shaped conduit means to said outlet port; said valve spool means being movable to a second position for connecting said discharge port to said outlet port and for blocking said U-shaped conduit means; means for manually and selectively moving said valve spool means into said first and second positions; means on said valve spool means operable for admitting pressure into said tank when the valve spool is moved to said second position for forcing the fuel from said reserve tank and out through said discharge port and outlet port to the fuel combustion means; said U-shaped fuel conduit means including a pair of spaced apart ports communicating at their inner ends with said bore, and a passage formed in the outer surface of the side of the control valve which abuts the tank and interconnects said last named pair of ports; and, a plurality of apertures formed through the wall of said tank and opening into said passage to communicate said tank with said passage.

References Cited in the file of this patent

UNITED STATES PATENTS

| 1,662,614 | Mandolini | Mar. 13, 1928 |
| 2,782,801 | Ludwig | Feb. 26, 1957 |
| 2,818,915 | Pfeiffer | Jan. 7, 1958 |

FOREIGN PATENTS

| 1,035,612 | France | Apr. 22, 1953 |
| 262,590 | Great Britain | Dec. 16, 1926 |